(12) United States Patent
Milne

(10) Patent No.: US 10,427,329 B2
(45) Date of Patent: Oct. 1, 2019

(54) INDUCTION HEATED MOLD APPARATUS WITH MULTIMATERIAL CORE AND METHOD OF USING THE SAME

(71) Applicant: SABIC Global Technologies B.V., Bergen op Zoom (NL)

(72) Inventor: Craig Lawrence Milne, Pittsfield, MA (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 90 days.

(21) Appl. No.: 15/306,112

(22) PCT Filed: Jun. 26, 2015

(86) PCT No.: PCT/IB2015/054843
§ 371 (c)(1),
(2) Date: Oct. 24, 2016

(87) PCT Pub. No.: WO2015/198288
PCT Pub. Date: Dec. 30, 2015

(65) Prior Publication Data
US 2017/0095944 A1 Apr. 6, 2017

Related U.S. Application Data

(60) Provisional application No. 62/018,064, filed on Jun. 27, 2014.

(51) Int. Cl.
*B29C 33/06* (2006.01)
*B29C 45/73* (2006.01)
(Continued)

(52) U.S. Cl.
CPC .............. *B29C 33/06* (2013.01); *B29C 45/73* (2013.01); *B29C 2035/0811* (2013.01);
(Continued)

(58) Field of Classification Search
CPC ..... B29C 2035/0811; B29C 2045/7368; B29C 2045/7393; B29C 33/06; B29C 45/73;
(Continued)

(56) References Cited

U.S. PATENT DOCUMENTS 2,393,541 A 1/1946 Kohler
2,454,847 A 11/1948 Slack, Jr.
(Continued)

FOREIGN PATENT DOCUMENTS

DE 7326694 U 12/1973
DE 2734346 A1 2/1979
(Continued)

OTHER PUBLICATIONS

Steel—Wikipedia_04012014 (Year: 2014).*
(Continued)

*Primary Examiner* — Matthew J Daniels
*Assistant Examiner* — Yunju Kim
(74) *Attorney, Agent, or Firm* — Cantor Colburn LLP

(57) ABSTRACT

A mold apparatus comprising: a core portion comprising a core surface, a first induction coil, and an inner core, and wherein the core portion has a core portion mass; a cavity portion comprising a second induction coil and a cavity surface, and wherein the cavity portion has a cavity portion mass; wherein the inner core comprises a non-magnetic material, the core surface comprises a magnetic material, and a density of the non-magnetic material is less than a density of the magnetic material; and wherein the core portion mass and the cavity portion mass differ by less than or equal to than 5%.

19 Claims, 2 Drawing Sheets

(51) Int. Cl.
  *B29C 35/08* (2006.01)
  *B29K 69/00* (2006.01)
  *B29K 105/16* (2006.01)

(52) U.S. Cl.
  CPC .............. *B29C 2045/7368* (2013.01); *B29C 2045/7393* (2013.01); *B29K 2069/00* (2013.01); *B29K 2105/16* (2013.01); *B29K 2905/00* (2013.01); *B29K 2909/02* (2013.01)

(58) Field of Classification Search
  CPC .............. B29C 33/00; B29K 2069/00; B29K 2105/16; B29K 2905/00; B29K 2909/02; H05B 6/10
  USPC ................... 425/375, 429; 219/633
  See application file for complete search history.

(56) References Cited

U.S. PATENT DOCUMENTS

| | | |
|---|---|---|
| 2,508,462 A | 5/1950 | Marshall |
| 2,705,342 A | 4/1955 | Hendry |
| 2,796,634 A | 6/1957 | Chellis |
| 2,979,773 A | 4/1961 | Bolstad |
| 2,984,887 A | 5/1961 | Thiess |
| 3,185,432 A | 5/1965 | Hager, Jr. |
| 3,488,411 A | 1/1970 | Goldman |
| 3,600,248 A | 8/1971 | Mojonnier et al. |
| 3,671,168 A | 6/1972 | Nussbaum |
| 3,691,339 A | 9/1972 | Cachat |
| 3,754,852 A * | 8/1973 | Rempel ................ B29C 33/00 425/429 |
| 3,763,293 A | 10/1973 | Nussbaum |
| 3,832,433 A | 8/1974 | Schaffer et al. |
| 3,974,250 A | 8/1976 | Cottis et al. |
| 4,044,188 A | 8/1977 | Segal |
| 4,060,364 A | 11/1977 | Gras |
| 4,201,742 A | 5/1980 | Hendry |
| 4,217,514 A | 8/1980 | Simazaki et al. |
| 4,340,551 A | 7/1982 | Wada et al. |
| 4,358,306 A | 11/1982 | Okamoto et al. |
| 4,390,485 A | 6/1983 | Yang |
| 4,406,703 A | 9/1983 | Guthrie et al. |
| 4,439,492 A | 3/1984 | Wada et al. |
| 4,452,943 A | 6/1984 | Goldman |
| 4,486,641 A | 12/1984 | Ruffini |
| 4,533,576 A | 8/1985 | Tanahashi et al. |
| 4,548,773 A | 10/1985 | Suh et al. |
| 4,563,145 A | 1/1986 | De Meij |
| 4,716,072 A | 12/1987 | Kim |
| 4,969,968 A | 11/1990 | Leatherman |
| 5,041,247 A | 8/1991 | Kim |
| 5,047,198 A | 10/1991 | Kim |
| 5,062,786 A | 11/1991 | Arai |
| 5,064,597 A | 11/1991 | Kim |
| 5,160,396 A | 11/1992 | Jensen et al. |
| 5,176,839 A | 1/1993 | Kim |
| 5,204,181 A | 4/1993 | Suzuki et al. |
| 5,219,642 A | 6/1993 | Meakin et al. |
| 5,232,653 A | 8/1993 | Addeo et al. |
| 5,234,637 A | 8/1993 | Reymann et al. |
| 5,238,627 A | 8/1993 | Matsuhisa et al. |
| 5,260,017 A | 11/1993 | Giles, Jr. |
| 5,272,720 A | 12/1993 | Cignetti et al. |
| 5,324,473 A | 6/1994 | Baresich |
| 5,338,497 A | 8/1994 | Murray et al. |
| 5,362,226 A | 11/1994 | Kataoka et al. |
| 5,376,317 A | 12/1994 | Maus et al. |
| 5,410,132 A | 4/1995 | Gregg et al. |
| 5,416,303 A | 5/1995 | Grooms et al. |
| 5,458,846 A | 10/1995 | Carroll |
| 5,489,410 A | 2/1996 | Baumgartner et al. |
| 5,530,227 A | 6/1996 | Matsen et al. |
| 5,535,980 A | 7/1996 | Baumgartner et al. |
| 5,591,369 A | 1/1997 | Matsen et al. |
| 5,645,744 A | 7/1997 | Matsen et al. |
| 5,654,246 A | 8/1997 | Newkirk et al. |
| 5,683,608 A | 11/1997 | Matsen et al. |
| 5,688,426 A | 11/1997 | Kirkwood et al. |
| 5,718,863 A | 2/1998 | McHugh et al. |
| 5,728,474 A | 3/1998 | Niemeyer et al. |
| 5,762,972 A | 6/1998 | Byon |
| 5,770,136 A | 6/1998 | Huang |
| 5,783,259 A | 7/1998 | McDonald |
| 5,837,183 A | 11/1998 | Inoue et al. |
| 5,945,042 A | 8/1999 | Mimura et al. |
| 6,023,054 A | 2/2000 | Johnson, Jr. |
| 6,176,839 B1 | 1/2001 | Deluis et al. |
| 6,237,789 B1 | 5/2001 | Zhu |
| 6,309,582 B1 | 10/2001 | Wu |
| 6,322,735 B1 | 11/2001 | Yamaki et al. |
| 6,461,801 B1 | 10/2002 | Wang |
| 6,759,781 B1 | 7/2004 | Bushko et al. |
| 6,960,860 B1 | 11/2005 | Decristofaro et al. |
| 7,132,632 B2 | 11/2006 | Huang |
| 7,135,653 B2 | 11/2006 | Routberg et al. |
| 8,202,465 B2 | 6/2012 | Yen et al. |
| 2002/0031963 A1 | 3/2002 | Mead |
| 2002/0113066 A1 | 8/2002 | Stark et al. |
| 2003/0006535 A1 | 1/2003 | Hennessey et al. |
| 2003/0021917 A1 | 1/2003 | Hotaka et al. |
| 2003/0091781 A1 | 5/2003 | Arakawa et al. |
| 2003/0141609 A1 | 7/2003 | Jia |
| 2004/0041303 A1 | 3/2004 | Kim et al. |
| 2004/0048463 A1 | 3/2004 | Haematsu |
| 2004/0058027 A1 | 3/2004 | Guichard et al. |
| 2004/0130057 A1 | 7/2004 | Mehrabi et al. |
| 2004/0212109 A1 | 10/2004 | Fujimoto et al. |
| 2004/0222566 A1 | 11/2004 | Park |
| 2004/0256383 A1 | 12/2004 | Fischer et al. |
| 2005/0003721 A1 | 1/2005 | Greulich et al. |
| 2005/0006380 A1 | 1/2005 | Kagan |
| 2005/0010275 A1 | 1/2005 | Sahatjian et al. |
| 2005/0011883 A1 | 1/2005 | Clothier et al. |
| 2005/0035115 A1 | 2/2005 | Anderson et al. |
| 2005/0179157 A1 | 8/2005 | Muranaka et al. |
| 2005/0245193 A1 | 11/2005 | Guichard et al. |
| 2007/0267405 A1 | 11/2007 | Feigen-Blum et al. |
| 2008/0303194 A1 | 12/2008 | Anbarasu et al. |
| 2009/0115104 A1 | 5/2009 | Anbarasu et al. |
| 2011/0081437 A1 | 4/2011 | Felker |
| 2013/0075956 A1 | 3/2013 | Waeckerle |

FOREIGN PATENT DOCUMENTS

| | | | |
|---|---|---|---|
| DE | 4337483 C1 | 4/1995 | |
| EP | 0351154 B1 | 1/1990 | |
| EP | 0361823 A2 | 4/1990 | |
| EP | 0551692 A1 | 7/1993 | |
| EP | 0415207 B1 | 2/1995 | |
| EP | 1120219 A1 | 8/2001 | |
| EP | 1275491 A1 | 1/2003 | |
| EP | 1925421 A1 | 5/2008 | |
| EP | 2037453 A1 | 3/2009 | |
| EP | 2065151 A1 | 6/2009 | |
| EP | 2520403 A1 | 11/2012 | |
| FR | 2867414 A1 | 9/2005 | |
| GB | 2134839 A | 8/1984 | |
| GB | 2310822 A | 9/1997 | |
| JP | 63078720 A | 4/1988 | |
| JP | 4173313 B | 6/1992 | |
| JP | H04173313 A * | 6/1992 | ............. B29C 45/73 |
| JP | 2001113580 A | 4/2001 | |
| JP | 4220309 A | 8/2004 | |
| JP | 2012214040 A | 11/2012 | |
| JP | 2013226810 A | 11/2013 | |
| WO | 9303080 A2 | 2/1993 | |
| WO | 9413454 A1 | 6/1994 | |
| WO | 9613368 A1 | 5/1996 | |
| WO | 9624413 A1 | 8/1996 | |
| WO | 0208316 A1 | 1/2002 | |
| WO | 02085601 A1 | 10/2002 | |
| WO | 03043769 A2 | 5/2003 | |
| WO | 2004048463 A1 | 6/2004 | |

(56) References Cited

FOREIGN PATENT DOCUMENTS

| WO | 2005118248 A2 | 12/2005 |
| WO | 2008154379 A1 | 12/2008 |
| WO | 2013079046 A1 | 6/2013 |

OTHER PUBLICATIONS

Ceramic Materials Properties Charts_11242015 (Year: 2015).*
Saturation (magnetic)—Wikipedia_04112014 (Year: 2014).*
Anonymous: "Saturation (Magnetic)—Wikipedia, The Free Encyclopedia", May 7, 2013 (May 7, 2013), pp. 1-3, SP055221964, Retrieved From the Internet: URL:https://en.wikipedia.org/w/index.php?title=saturation_(magnetic)&oldid=553941200 [Retrieved on Oct. 19, 2015].
International Search Report for International Application No. PCT/IB2015/054843; International Filing Date: Jun. 26, 2015; dated Oct. 29, 2015; 5 Pages.
Jan J. Schut: Induction Heated Molds Produce Class a Thermoplastic Composites: Plastics Technology, Nov. 1, 2006 (Nov. 1, 2006), pp. 1-3, XP055222264, Retrieved From the Internet: URL:http/://www.ptonline.com/articles/induction-heated-molds-produce-class-a-thermoplastic-composites [Retrieved on Oct. 20, 2015].
Plastic Technology; vol. 34; Jun. 1988; p. 150.
Polymer Engineering and Science; vol. 34 (11); 1994; p. 894.
U.S. Department of Energy: Energy Efficiency and Renewable Energy. "Energy Savers: Phenolic Foam Insulation Material" (Feb. 24, 2009). pp. 1-2. Link: http://www.energysavers.gov/your_home/insulation_airsealing/index.cfm/mytopic=11730.
Written Opinion of the International Searching Authority for International Application No. PCT/IB2015/054843; International Filing Date: Jun. 26, 2015; dated Oct. 29, 2015; 12 Pages.

* cited by examiner

INDUCTION HEATED MOLD APPARATUS WITH MULTIMATERIAL CORE AND METHOD OF USING THE SAME

CROSS REFERENCE TO RELATED APPLICATIONS

This application is a 371 of International Application No. PCT/IB2015/054843, filed Jun. 26, 2015, which claims the benefit of Provisional Application No. 62/018,064, filed Jun. 27, 2014, both of which are incorporated by reference in their entirety herein.

TECHNICAL FIELD

Disclosed herein are a method and apparatus for forming polymeric parts. More specifically, disclosed herein is a mold apparatus for compression and injection molding polymeric parts having complex geometries where the mass of the core significantly contributes to the heating and cooling rates of the mold apparatus.

BACKGROUND

Injection molding processes require heating a mold surface to temperatures near the injection temperature of the polymer. This is accomplished by conducting heat to the mold surfaces using an internal and/or external source of heat. This process involves surface temperatures of the polymer part that exceed ejection temperatures of the part. Thus, it is necessary to cool the mold and the molded part prior to ejecting the part. However, heating and cooling the mold lengthens the cycle time, which decreases production efficiency. In addition, due to the high pressure that can be required in some processes, high strength materials, such as steel, are used to form the body of the mold. Thus, the molding cycle is also limited by the heat transfer through the material of the mold body. Also, complex three dimensional mold surfaces can result in uneven or non-uniform surface temperatures. The temperature gradients create hot and cold spots on the mold surfaces, which can negatively impact the surface appearance of the molded polymeric part and contribute to a longer cycle time.

Accordingly, there is a need for a mold and method of molding a polymeric part that is capable of employing complex mold surface geometries while producing uniform surface temperatures and reducing the heating and cooling rate. Also, there is a need for a molding apparatus that is capable of withstanding high mold pressures.

SUMMARY

Disclosed, in various embodiments, is a mold apparatus, and methods for using the same.

In an embodiment, a mold apparatus can comprise: a core portion comprising a core surface, a first induction coil, and an inner core, and wherein the core portion has a core portion mass; a cavity portion comprising a second induction coil and a cavity surface, and wherein the cavity portion has a cavity portion mass; wherein the inner core comprises a non-magnetic material, the core surface comprises a magnetic material, and a density of the non-magnetic material is less than a density of the magnetic material; and wherein the core portion mass and the cavity portion mass differ by less than or equal to than 5%.

In another embodiment, a mold apparatus can comprise: a core portion comprising a core surface, a first induction coil, and an inner core; a cavity portion comprising a second induction coil and a cavity surface; wherein the inner core comprises a non-magnetic material, the core surface comprises a magnetic material, and the density of the non-magnetic material is less than the density of the magnetic material; wherein the mass of the core portion and the mass of the cavity portion differ by less or equal to than 5%; wherein the core portion and cavity portion comprise cooling rates that differ by less than or equal to 5%; wherein the core portion and cavity portion comprise heating rates that differ by less than or equal to 5%.

In still another embodiment, a mold apparatus can comprise: a core portion comprising a core surface, a first induction coil, and a ceramic inner core having an inner core density; a cavity portion comprising a second induction coil and a cavity surface, and wherein the cavity portion has a cavity portion mass; the core surface comprises a material having a core density, and the inner core density is less than the core density.

In an embodiment, a method for molding a polymeric product in the mold apparatus described herein can comprise: heating a core surface and a cavity surface through induction heating; placing a polymeric material between the core surface and the cavity surface to form a molded product; cooling the core surface and the cavity surface by turning off the first induction coil and the second induction coils; opening the mold apparatus; removing the molded product.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
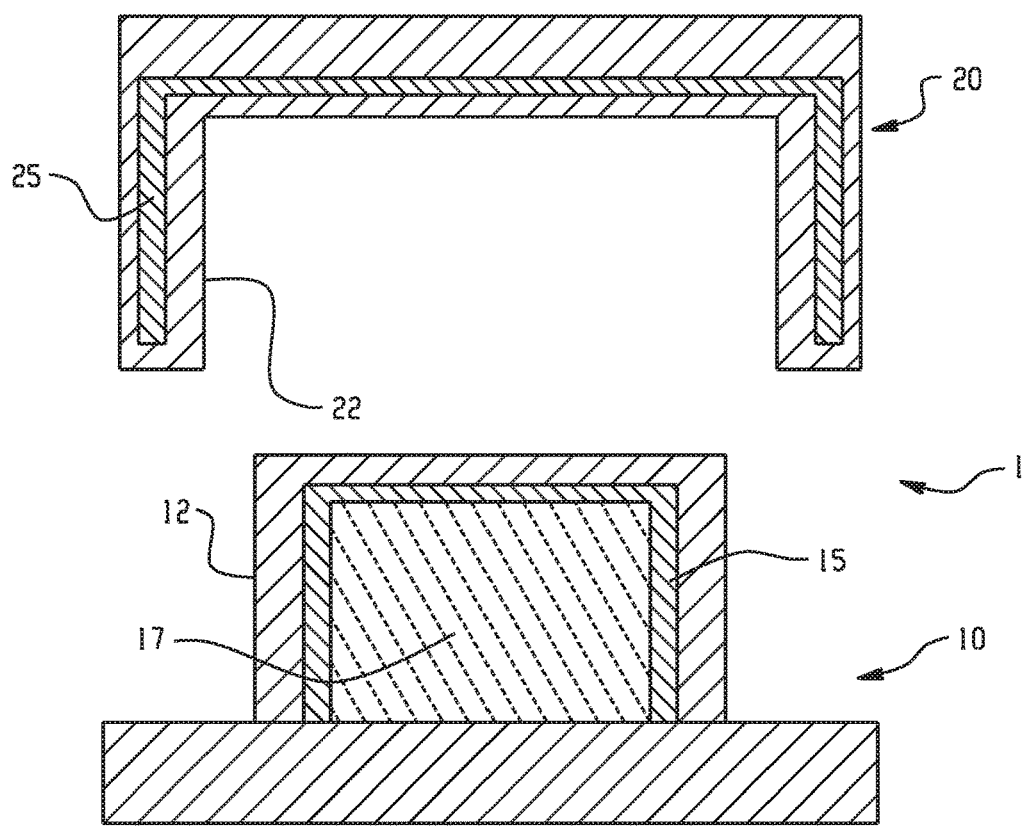
FIG. 1 is an illustration of cross sectional front view of a mold apparatus.

Disclosed herein are a mold apparatus and a method for using the same. The mold apparatus described herein utilizes induction heating and is capable of rapid heating and cooling while providing uniform temperature distribution at the surfaces of the mold. It is believed that the favorable results obtained herein, e.g., rapid heating and cooling and uniform temperature distribution, can be achieved by removing steel mass in the core of the mold and replacing it with a low density, high strength material. The replacement material can provide the support within the mold to achieve high cavity pressures.

The mold includes a core portion and a cavity portion. Both the core portion and the cavity portion can include induction coils to heat the surfaces of the mold. The core portion can include a core surface made from a metallic magnetic material, and an inner core including a low density, high strength, non-magnetic material that is capable of withstanding high mold pressures. As used herein, "magnetic material" refers to materials that have a saturation flux density of greater than or equal to 0.2 Tesla.

As used herein "high strength" includes materials that can withstand molding pressures of 100 pounds per square inch (psi) to 25,000 psi (7 bars to 1,724 bars). The core surface can include steel, iron, steel, carbon, magnesium, and combinations comprising at least one of the foregoing. The inner core can comprise a material having a saturation flux density that is less than 0.2 Tesla, specifically, less than or equal to 0.1 Tesla, and more specifically less than or equal to 0.05 Tesla. The inner core can include ceramic. For example, the inner core can be zirconia, porcelain, forsterite, alumina, and combinations including at least one of the foregoing, such as lithia porcelain, alumina porcelain, zirconia porcelain. Optionally, the inner core can comprise zirconia. Inner core 17 can include a material with a lower density than the material of core surface. Another induction coil can be located between the inner core and the core surface.

The core surface and/or cavity surface can include a complex geometry. For example, the core surface and/or cavity surface can include a cross sectional shape that includes curves, corners, depressions, protrusions, bends, and the like. The cross sectional geometry of the mold surface can include trapezoidal shapes, sawtooth shapes, sinusoidal, lamellar, triangular abs(sin), cycloid-shaped configurations, and combinations featuring at least one of the foregoing.

The inner core can include a material with a lower density than the material of the core surface. Thus, a reduction in the overall mass of core portion can be attained. For example, the ratio of the density of the material of the core surface to the density of the material of the inner core can be 3:2 or greater. The density of the material forming the core surface can be greater than or equal to two times the density of the material of the inner core.

In addition, heating and cooling cycles can be reduced when the mass of the core and cavity portions are balanced. For example, the core and the cavity can have a mass that differs by less than 5%. The core and the cavity can have a mass that differs by less than or equal to 3%. The core and the cavity can include a mass that differs by less than or equal to 1%.

The core and cavity mold surfaces, as well as the polymer, can be cooled by passing a liquid cooling medium through at least one of the core and cavity portions of the mold. When the core and cavity surfaces are cooled to a predetermined ejection temperature, the mold is opened and the formed polymer part is ejected.

The mold surfaces can include a uniform temperature. For example, the temperature at any point along the core surface and cavity surface can vary by less than or equal to 3 degrees Celsius (° C.). The temperature can vary at any point along the core surface and cavity surface by 2° C. or less. The temperature at any point along the core surface and cavity surface can vary by 1° C. or less. The temperature of the core surface and/or cavity surface can fluctuate by less than or equal to 5% across the entirety of the surface. The temperature of the core surface and/or cavity surface can fluctuate by less than or equal to 3% across the entirety of the surface. The temperature of the core surface and/or cavity surface can fluctuate by less than or equal to 1% across the entirety of the surface The cooling and/or heating rates of the core surface and cavity can be substantially the same, which can reduce the overall cycle time. For example, the core portion and cavity portion can include surface cooling rates that differ by less than or equal to 5%. The core portion and cavity portion can include surface cooling rates that differ by less than or equal to 3%. The core portion and cavity portion can include surface cooling rates that differ by less than or equal to 1%. In addition, the core portion and the cavity portion can include surface heating rates that differ by less than or equal to 5%. The core portion and cavity portion can include surface heating rates that differ by less than or equal to 3%. In addition, the core portion and cavity portion can include surface heating rates that differ by less than or equal to 1%.

Possible polymeric materials the can be processed in the mold apparatus include a thermoplastic material, thermoset material, or a combination of thermoplastic and thermoset materials. The thermoplastic material can include a polycarbonate, a polyester (such as poly(ethylene terephthalate), poly(butylene terephthalate), and poly(lactic acid)), a polyamide (such as aliphatic polyamides including nylon 6, semi-aromatic polyphthalamides, and aromatic polyamides), a polyimide (such as polyetherimide), a polyketone (such as poly(ether ether ketone) (PEEK), poly(ether ketone), and poly(aryl ether ketone)), a polysulfide (such as poly(phenylene sulfide)), a polysulfone (such as poly(ether sulfone)), a polyacrylate (such as poly(methyl methacrylate)), a polyacetal (such as poly(oxymethylene)), a polyacetate (such as poly(vinyl acetate)), a fluoro plastic (such as polytetrafluoroethylene), a chloro plastic (such as poly(vinyl chloride) and poly(vinylidene chloride)), a polyethylene (such as high density polyethylene, low density polyethylene, and ultra-high molecular weight polyethylene), a polyurethane, polypropylene, an acrylonitrile butadiene styrene (ABS) copolymer, a styrene acrylonitrile (SAN) copolymer, polyphenylene, polyvinyl alcohol, polystyrene, polycaprolactone, polybutylene, polybutadiene, a copolymer comprising at least one or more of the foregoing, or a blend comprising at least one or more of the foregoing. For example, the thermoplastic material can comprise a polycarbonate/ABS blend (CYCOLOY™ resins commercially available from SABIC's Innovative Plastics business), a copolycarbonate-polyester, acrylic-styrene-acrylonitrile (ASA) (GELOY™ resins commercially available from SABIC's Innovative Plastics business), a blend of polyphenylene ether/polyamide (NORYL GTX™ resins from SABIC's Innovative Plastics business), a blend of polycarbonate/polyethylene terephthalate (PET)/polybutylene terephthalate (PBT), polybutylene terephthalate and impact modifier (XENOY™ resins commercially available from SABIC's Innovative Plastics business), polycarbonate (LEXAN™ and LEXAN™ EXL resins commercially available from SABIC's Innovative Plastics business), poly(methyl)meth acrylate (PMMA) capped polycarbonate, polyetherimide (ULTEM™ polyetherimide resin (e.g., EC006PXQ™ and/or EC008PXQ™) or SILTEM™, both commercially available SABIC's Innovative Plastics business).

The polymeric material can include a filler. Non-limiting examples of fillers include silica powder, such as fused silica, crystalline silica, natural silica sand, and various silane-coated silicas; boron-nitride powder and boron-silicate powders; alumina and magnesium oxide (or magnesia); wollastonite including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises greater than or equal to 98 wt % $CaCO_3$ with the remainder being other inorganics such as magnesium carbonate, iron oxide and alumino-silicates; surface-treated calcium carbonates; talc, including fibrous, modular, needle shaped, and lamellar talcs; glass spheres, both hollow and solid, and surface-treated glass spheres typically having coupling agents such as silane coupling agents and/or containing a conductive coating; kaolin, including hard, soft, calcined kaolin, and kaolin comprising various coatings that facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; fillite; aluminosilicate (armospheres), including silanized and metallized aluminosilicate; quartz; quartzite; perlite; tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; carbon black, including conductive carbon black; and graphite, such as graphite powder.

The filler can have an aspect ratio greater than 1. Such fillers can exist in the form of flakes, whiskers, fibers, needles, rods, tubes, strands, elongated platelets, lamellar platelets, ellipsoids, micro fibers, nanofibers, nanotubes, elongated fullerenes, and the like. Where such fillers exist in aggregate form, an aggregate having an aspect ratio greater than 1 will also suffice. Examples of such fillers well known in the art include those described in "Plastic Additives Handbook, 5th Edition" Hans Zweifel, Ed, Carl Hanser Verlag Publishers, Munich, 2001.

Non-limiting examples of flakes having an aspect ratio greater than 1 include glass flakes, flaked silicon carbide, aluminum diboride, aluminum flakes, and steel flakes. Non-limiting examples of fibrous fillers include processed mineral fibers such as those derived from blends comprising at least one of aluminum silicates, aluminum oxides, magnesium oxides, calcium sulfate hemihydrate, boron fibers, ceramic fibers such as silicon carbide, and fibers from mixed oxides of aluminum, boron, and silicon sold under the trade name NEXTEL™ by 3M Co., St. Paul, Minn., USA; and natural fibers including wood flour, cellulose, cotton, sisal, jute, starch, cork flour, lignin, ground nut shells, corn, rice grain husks, cloth, hemp cloth, felt, and natural cellulosic fabrics such as Kraft paper, cotton paper, and glass fiber containing paper. Synthetic reinforcing fibers can be used provided the glass transition temperature of the synthetic fiber is greater than that of the thermoplastic material. Suitable synthetic fibers include polyester fibers such as poly(ethylene terephthalate) and poly(butylene terephthalate), poly(vinyl alcohol) fibers, polyarylates, polyethylene, aromatic polyamide fibers, polybenzimidazole fibers, poly(phenylene sulfide) fibers, poly(ether ether ketone) fibers, polytetrafluoroethylene fibers, acrylic resin fibers, high tenacity fibers with high thermal stability including aromatic polyamides, polyaramid fibers such as Kevlar (product of Du Pont), polyimide fibers such as polyimide 2080 and PBZ fiber (both products of Dow Chemical Company) and polyetherimide fibers; poly(ether ether ketone) fibers, polybenzoxazole fibers, and the like. Fibrous fillers such as basalt fibers, including textile glass fibers and quartz are also considered.

The filler can comprise glass fibers. Useful glass fibers can be formed from any type of fiberizable glass composition known to those skilled in the art, and include those prepared from fiberizable glass compositions commonly known as "E-glass," "A-glass," "C-glass," "D-glass," "R-glass," "S-glass," as well as E-glass derivatives that are fluorine-free and/or boron-free. Such compositions and methods of making glass filaments therefrom are well known to those skilled in the art and a more detailed description is not necessary.

The filler can comprise a carbon fiber. The carbon fibers can have an average diameter of 3.5 nanometers to 5 micrometers, specifically 4 to 100 nanometers, more specifically 5 to 10 nanometers. The carbon fibers can be vapor-grown carbon fibers. The carbon fiber can comprise carbon nanotubes. The carbon nanotubes can have a length to diameter ratio of up to 132,000,000:1. The carbon nanotubes can comprise single walled nanotubes and/or multi-walled nanotubes.

The filler can be used with various coatings, including, for example, metallic coatings and silane coating.

In general the amount of optional fibrous filler present in the thermoplastic composition can be up to 70 weight percent (wt %) (e.g., greater than 0 to 70 wt %) based on the total weight of the composition, specifically 10 to 60 wt %, and more specifically, 20 to 50 wt % thereof.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 is a cross-sectional illustration of a mold apparatus 1 for heating a polymer. The polymer may be an unfilled resin or it may contain reinforcement fibers and/or mineral reinforcement. The mold apparatus 1 includes a cavity portion 20 and a core portion 10. Cavity portion 20 includes a cavity surface 22 and induction coil 25. Core portion 10 includes a core surface 12 and an inner core 17. Induction coil 15 can be located between core surface 12 and inner core 17. Cavity surface 22 and core surface 12 interface with a polymeric material that is introduced into the mold. The polymeric material can be introduced in any suitable manner. For example, the polymeric material can be injected into the mold in a molten state.

Core portion 10 can include core surface 12, induction coil 15 and inner core 17. Core surface 12 can include a magnetic material. Suitable materials for core surface 12 include iron, steel, carbon, magnesium, and combinations comprising at least one of the foregoing. The material for core surface 12 can include a saturation flux density that is greater than or equal to 0.2 Tesla. The material for core surface 12 can include a saturation flux density that is greater than or equal to 0.4 Tesla. The material for core surface 12 can include a saturation flux density that ranges from 0.4 Tesla to 2.5 Tesla.

Inner core 17 can include a non-magnetic material that is capable of withstanding molding pressures of 100 psi to 30,000 psi (7 bar to 2,068 bar), for example 100 psi to 25,000 psi (7 bar to 1,724 bar), specifically, 500 psi to 20,000 psi (34 bar to 1,379 bar), more specifically 1,000 psi to 20,000 psi (69 bar to 1,379 bar), even more specifically 5,000 psi to 20,000 psi (345 bar to 1,379 bar), or even withstand molding pressures of 30,000 psi (2,068 bar). For example, inner core 17 can include zirconia, porcelain, forsterite, alumina, and combinations including at least one of the foregoing, such as lithia porcelain, alumina porcelain, zirconia porcelain. Inner core 17 can include a material with a lower density than the material of core surface 12. Thus, a reduction in the overall mass of core portion 10 can be attained. For example, the ratio of the density of the material forming the core surface 12 to the density of the material forming the inner core 17 can be 3:2 or greater. The ratio of the density of the material forming the core surface 12 to the density of the material forming the inner core 17 can be 2:1 or greater. The use of a lower density material in inner core 17 allows for the tailoring of the mass distribution of the core portion 10, which can enable an even mold temperature.

Inner core 17 can form the majority of core portion 10. For example, inner core 17 can include 75% or more of the total volume of core portion 10. Inner core 17 can include greater than or equal to 85% of the total volume of core portion 10. Inner core 17 can include greater than or equal to 90% of the total volume of core portion 10.

Cavity portion 20 includes a cavity surface 22 and induction coil 25. Cavity surface can include the same material as core surface 12, or a different material. Possible materials for cavity surface 22 include steel, iron, steel, carbon, magnesium, and combinations comprising at least one of the foregoing. The material for cavity surface 22 can include a saturation flux density that is greater than or equal to 0.2 Tesla. The material for cavity surface 22 can include a saturation flux density that is greater than or equal to 0.4 Tesla. The material for cavity surface 22 can include a saturation flux density that ranges from 0.4 Tesla to 2.5 Tesla.

The overall mass of the core portion 10 and the cavity portion 20 can be balanced, which allows for similarity in heating and cooling rates for the two portions. For example, the mass of core portion 10 and the mass of cavity portion 20 can differ by 20% or less. The mass of core portion 10 and the mass of cavity portion 20 can differ by 10% or less. The mass of core portion 10 and the mass of cavity portion 20 can differ by 5% or less.

Induction coils 15, 25 generate eddy currents within the core surface 12 and cavity surface 22 and resistance leads to heating of the surfaces. Possible induction coils 15, 25, for example, are commercially available from Ambrell/Ameritherm, Inc. of Scottsville, N.Y.

Mold apparatus 1 can produce a uniform temperature distribution along core surface 12 and cavity surface 22. For example, the temperature at any point along the core surface 12 and cavity surface 22 can vary by less than 3 degrees Celsius (° C.). The temperature can vary at any point along the core surface 12 and cavity surface 22 can vary by 2° C. or less. The temperature at any point along the core surface 12 and cavity surface 22 can vary by 1° C. or less. The temperature of the core surface 12 and/or cavity surface 22 can fluctuate by less than or equal to 5% across the entirety of the core surface 12 and cavity surface 22. The temperature of the core surface 12 and/or cavity surface 22 can fluctuate by less than or equal to 3% across the entirety of the surface. The temperature of the core surface 12 and/or cavity surface 22 can fluctuate by less than or equal to 1% across the entirety of the surface. A uniform or homogenous temperature along the mold surfaces prevents the occurrence of "hot spots" which can lead to longer mold cycles and flaws on the polymeric part.

The cooling and/or heating rates of the core surface and cavity can be substantially the same, which can reduce the overall cycle time. For example, the core portion 10 and cavity portion 20 can include surface cooling rates that differ by less than or equal to 5%. The core portion 10 and cavity portion 20 can include surface cooling rates that differ by less than or equal to 3%. The core portion 10 and cavity portion 20 can include surface cooling rates that differ by less than or equal to 1%. In addition, the core portion 10 and cavity portion 20 can include surface heating rates that differ by less than or equal to 5%. The core portion 10 and cavity portion 20 can include surface heating rates that differ by less than or equal to 3%. In addition, the core portion 10 and cavity portion 20 can include surface heating rates that differ by less than or equal to 1%.

In operation the core surface 12 and cavity surface 22 are heated through induction heating using induction coils 15 and 25, respectively. A polymeric material is disposed into the area located between the core portion 10 and cavity portion 20. The polymeric material can be introduced in any manner. For example, the polymeric material can be injected in a molten state into mold apparatus 1. Mold apparatus 1 is closed and pressure is applied to the polymeric material to form a polymeric product. The injection pressure can be 1,000 psi to 30,000 psi (69 bars to 2,068 bars). Core surface 12 and the cavity surface 22 are cooled. For example, core surface 12 and cavity mold surface 22, as well as the polymer, can be cooled by passing a liquid cooling medium through at least one of the core portion 10 and cavity portion 20 of mold apparatus 1. Next, mold apparatus 1 is opened and molded polymeric product is then ejected from mold apparatus 1

Figure 3:
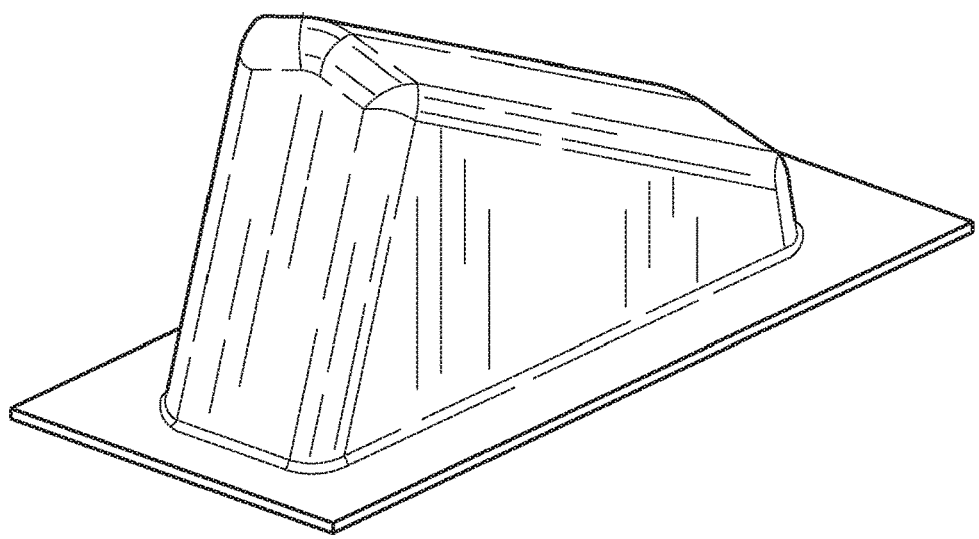
FIG. 3 is an isometric view of a molded part having a complex geometry.
Figure 2:
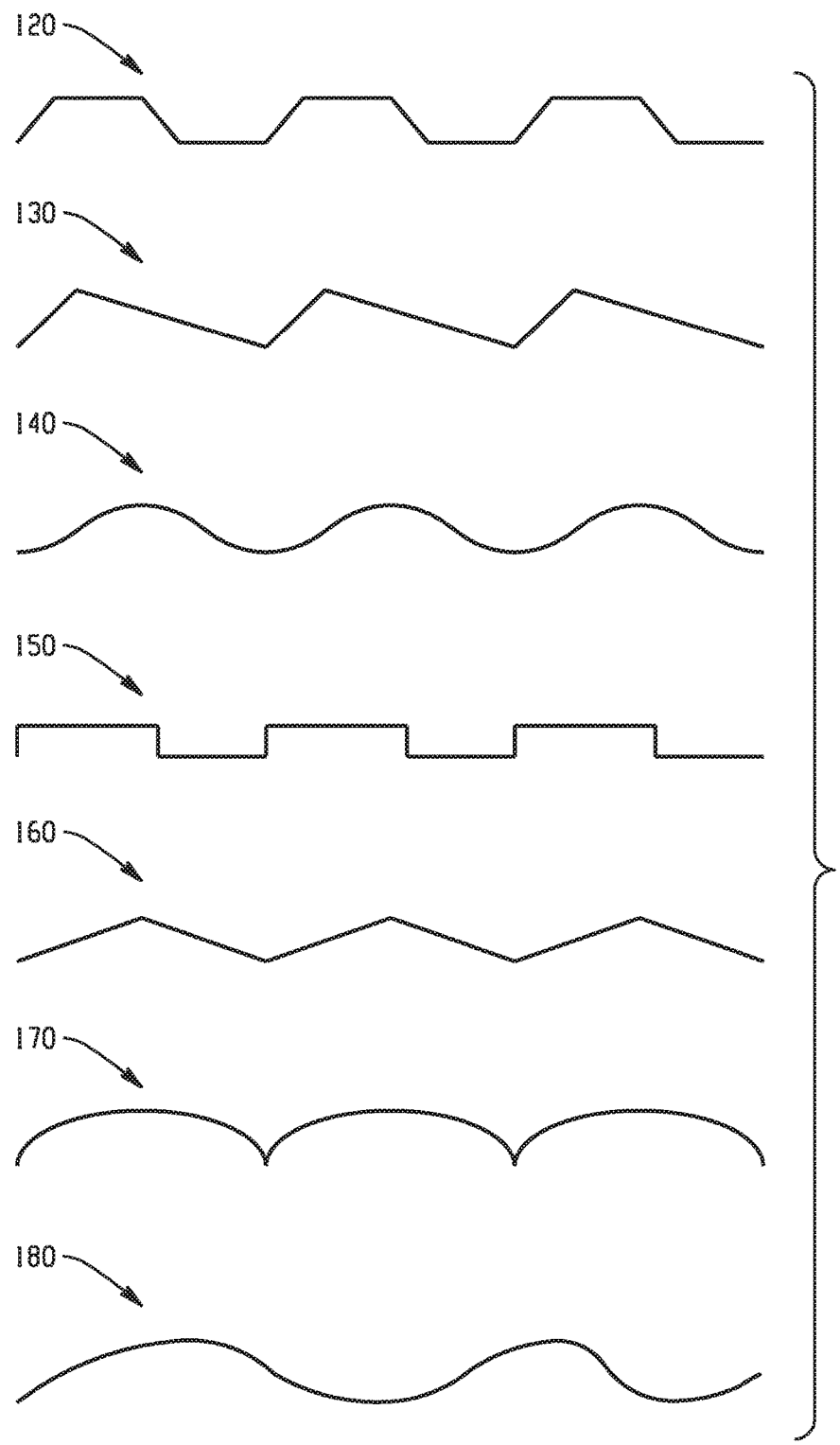
FIG. 2 is a cross sectional view of several mold surfaces having complex geometries.

FIG. 2 illustrates some of the complex geometric configurations that core surface 12 and/or cavity surface 22 can include. Either or both of these surfaces can include three dimensional (e.g., non-flat) configurations. For example, the core surface 12 and/or cavity surface 22 can include trapezoidal-shaped configurations 120. The core surface 12 and/or cavity surface 22 can include saw tooth-shaped configurations 130. The core surface 12 and/or cavity surface 22 can include sinusoidal-shaped configurations 140. The core surface 12 and/or cavity surface 22 can include lamellar-shaped configurations 150. The core surface 12 and/or cavity surface 22 can include triangular-shaped configurations 160. The core surface 12 and/or cavity surface 22 can include abs(sin)-shaped configurations 170. The core surface 12 and/or cavity surface 22 can include cycloid-shaped configurations 180. In addition, core surface 12 and/or cavity surface 22 can include combinations including at least one of the complex geometric configurations. FIG. 3 illustrates a molded article having a complex geometry.

Set forth below are some embodiments of molds and methods of using the same.

Embodiment 1

A mold apparatus comprising: a core portion comprising a core surface, a first induction coil, and an inner core, and wherein the core portion has a core portion mass; a cavity portion comprising a second induction coil and a cavity surface, and wherein the cavity portion has a cavity portion mass; wherein the inner core comprises a non-magnetic material, the core surface comprises a magnetic material, and wherein the core portion mass and the cavity portion mass differ by less than or equal to than 5%.

Embodiment 2

The mold apparatus of Embodiment 1, wherein a density of the non-magnetic material is less than a density of the magnetic material.

Embodiment 3

The mold apparatus of Embodiments 1 or 2, wherein the ratio of the density of the magnetic material and the density of the non-magnetic material is greater than or equal to 3:2, preferably wherein the ratio of the density of the magnetic material and the density of the non-magnetic material is from 3:2 to 3:1.

Embodiment 4

A mold apparatus comprising: a core portion comprising a core surface having a saturation flux density of greater than or equal to 0.2 Tesla, a first induction coil, and a ceramic inner core having an inner core density; a cavity portion comprising a second induction coil and a cavity surface, and wherein the cavity portion has a cavity portion mass; the core surface comprises a material having a core density, and the inner core density is less than the core density.

Embodiment 5

The mold apparatus of Embodiment 4, wherein the ratio of the core density and the inner core density is greater than or equal to 3:2.

Embodiment 6

The mold apparatus of Embodiment 5, wherein the ratio is from 3:2 to 3:1.

Embodiment 7

The mold apparatus of any of Embodiments 1-6, wherein the core portion and cavity portion comprise surface cooling rates that differ by less than or equal to 1%.

Embodiment 8

The mold apparatus of any of Embodiments 1-7, wherein the core surface comprises steel, iron, carbon, magnesium, and combinations comprising at least one of the foregoing.

Embodiment 9

The mold apparatus of any of Embodiments 1-8, wherein the cavity surface comprises steel, iron, carbon, magnesium, and combinations comprising at least one of the foregoing.

Embodiment 10

The mold apparatus of any of Embodiments 1-9, wherein the core portion and cavity portion have surface heating rates that differ by less than or equal to 5%.

Embodiment 11

The mold apparatus of any of Embodiments 1-10, wherein the core portion and cavity portion comprise surface heating rates that differ by less than 3%.

Embodiment 12

The mold apparatus of any of Embodiments 1-11, wherein the core portion and cavity portion comprise surface heating rates that differ by less than or equal to 1%.

Embodiment 13

The mold apparatus of any of Embodiments 1-12, wherein the temperature of the core surface fluctuates by less than or equal to 1% across the entire surface.

Embodiment 14

The mold apparatus of any of Embodiments 1-13, wherein the temperature of the cavity surface fluctuates by less than or equal to 1% across the entire surface.

Embodiment 15

The mold apparatus of any of the preceding claims, wherein the inner core as a saturation flux density of less than or equal to 0.1 Tesla.

Embodiment 16

The mold apparatus of any of the preceding claims, wherein the core portion has a total volume and wherein the inner core is greater than or equal to 75% of the total volume of the core portion, preferably greater than or equal to 85% of the total volume of the core portion, and more preferably greater than or equal to 95% of the total volume of the core portion.

Embodiment 17

The mold apparatus of any of Embodiments 1-8, wherein the inner core comprises zirconia, porcelain, forsterite, alumina, and combinations comprising at least one of the foregoing, preferably, the inner core comprises lithia porcelain, alumina porcelain, zirconia porcelain, or a combination comprising at least one of the foregoing.

Embodiment 18

The mold apparatus of any of Embodiments 1-17, wherein the inner core comprises ceramic.

Embodiment 19

The mold apparatus of any of Embodiments 1-18, wherein the core portion and cavity portion comprise surface cooling rates that differ by less than or equal to 5%.

Embodiment 20

The mold apparatus of any of Embodiments 1-19, wherein the core portion and cavity portion comprise surface cooling rates that differ by less than or equal to 3%.

Embodiment 21

A mold apparatus comprising: a core portion comprising a core surface, a first induction coil, and an inner core; a cavity portion comprising a second induction coil and a cavity surface; wherein the inner core comprises a non-magnetic material, the core surface comprises a magnetic material, and the density of the non-magnetic material is less than the density of the magnetic material; wherein the mass of the core portion and the mass of the cavity portion differ by less or equal to than 5%; wherein the core portion and cavity portion comprise cooling rates that differ by less than or equal to 5%; wherein the core portion and cavity portion comprise heating rates that differ by less than or equal to 5%.

Embodiment 22

A method for molding a polymeric product in the mold apparatus of any of Embodiments 1-21 comprising: heating a core surface and a cavity surface through induction heating by passing an electrical current through the first induction coil and the second induction coil; placing a polymeric material between the core surface and the cavity surface to form a molded product; cooling the core surface and the cavity surface by stopping the flow of the electrical current through the first induction coil and the second induction coils; opening the mold apparatus; removing the molded product.

Embodiment 23

The method of Embodiment 22, wherein heating the core portion and cavity portion comprises generating a uniform temperature distribution along core surface and cavity surface.

Embodiment 24

The method of Embodiments 22 or 23, wherein the temperature at any point along the core surface and cavity surface varies by less than 3° C.

Embodiment 25

The method of any of Embodiments 22-24, wherein the temperature of the core surface and/or cavity surface differs by less than or equal to 5% across the entirety of the core surface and cavity surface.

Embodiment 26

The method of any of Embodiments 22-25, wherein cooling the core surface and cavity surface comprises introducing a cooling fluid through the core portion and the cavity portion Embodiment 27

The method of any of Embodiments 22-26, wherein the polymeric material comprises thermoplastic material, thermoset material, or a combination of thermoplastic and thermoset materials.

Embodiment 28

The method of any of Embodiments 22-27, wherein the polymeric material comprises polycarbonate.

Embodiment 29

The method of any of Embodiments 22-28, wherein the polymeric material further comprises a filler.

Embodiment 30

A molded product formed through the method of any of Embodiments 22-29.

All ranges disclosed herein are inclusive of the endpoints, and the endpoints are independently combinable with each other (e.g., ranges of "up to 25 wt. %, or, more specifically, 5 wt. % to 20 wt. %," is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to determine one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment", "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A mold apparatus comprising:
  a core portion comprising a core surface, a first induction coil, and an inner core, and wherein the core portion has a core portion mass;
  a cavity portion comprising a second induction coil and a cavity surface, and wherein the cavity portion has a cavity portion mass;
  wherein the inner core comprises a non-magnetic material, the core surface comprises a magnetic material, and a density of the non-magnetic material is less than a density of the magnetic material; and
  wherein the core portion mass and the cavity portion mass differ by less than or equal to than 5%.

2. The mold apparatus of claim 1, wherein the inner core comprises ceramic.

3. The mold apparatus of claim 1, wherein the ratio of the density of the magnetic material and the density of the non-magnetic material is greater than or equal to 3:2.

4. The mold apparatus of claim 1, wherein the core portion has a saturation flux density of greater than or equal to 0.2 Tesla.

5. The mold apparatus of claim 1, wherein the core portion and cavity portion comprise surface cooling rates that differ by less than or equal to 5%.

6. The mold apparatus of claim 1, wherein the core surface comprises steel, iron, carbon, magnesium, and combinations comprising at least one of the foregoing.

7. The mold apparatus of claim 1, wherein the cavity surface comprises steel, iron, carbon, magnesium, and combinations comprising at least one of the foregoing.

8. The mold apparatus of claim 1, wherein the core portion and cavity portion have surface heating rates that differ by less than or equal to 5%.

9. The mold apparatus of claim 1, wherein the temperature of the core surface, or the cavity surface, or of both the core surface and the cavity surface fluctuates by less than or equal to 1% across the entire surface.

10. The mold apparatus of claim 1, wherein the inner core has a saturation flux density of less than or equal to 0.1 Tesla.

11. The mold apparatus of claim 1, wherein the core portion has a total volume and wherein the inner core is greater than or equal to 75% of the total volume of the core portion.

12. A method for molding a polymeric product in a mold apparatus, wherein the mold apparatus comprising: a core portion comprising a core surface, a first induction coil, and an inner core, and wherein the core portion has a core portion mass; a cavity portion comprising a second induction coil and a cavity surface, and wherein the cavity portion has a cavity portion mass; wherein the inner core comprises a non-magnetic material, the core surface comprises a magnetic material, and a density of the non-magnetic material is less than a density of the magnetic material; and wherein the core portion mass and the cavity portion mass differ by less than or equal to than 5%, the method comprising:

heating a core surface and a cavity surface through induction heating by passing an electrical current through the first induction coil and the second induction coil;

placing a polymeric material between the core surface and the cavity surface to form a molded product;

cooling the core surface and the cavity surface by stopping the flow of the electrical current through the first induction coil and the second induction coil;

opening the mold apparatus; and removing the molded product.

13. The method of claim 12, wherein heating the core portion and cavity portion comprises generating a uniform temperature distribution along the core surface and cavity surface.

14. The method of claim 12, wherein the temperature at any point along the core surface and cavity surface varies by less than 3° C.

15. The method of claim 12, wherein the temperature of the core surface and/or cavity surface differs by less than or equal to 5% across the entirety of the core surface and cavity surface.

16. The method of claim 12, wherein cooling the core surface and cavity surface comprises introducing a cooling fluid through the core portion and the cavity portion.

17. The method of claim 12, wherein the polymeric material comprises thermoplastic material, thermoset material, or a combination of thermoplastic and thermoset materials.

18. The method of claim 12, wherein the polymeric material comprises polycarbonate.

19. The method of claim 12, wherein the polymeric material further comprises a filler.

* * * * *